March 29, 1960  J. D. FANNIN  2,930,348
PAINT MASKING DEVICE
Filed Aug. 13, 1957

INVENTOR
John D. Fannin

BY *Shoemaker & Mactare*

ATTORNEYS

United States Patent Office 2,930,348
Patented Mar. 29, 1960

2,930,348

PAINT MASKING DEVICE

John D. Fannin, Mare Creek, Ky.

Application August 13, 1957, Serial No. 677,909

6 Claims. (Cl. 118—505)

This invention relates to paint masking devices and, more particularly, to a device for masking the wheel and tire of a vehicle.

A problem which frequently arises in automobile body paint shops is that of masking off a wheel and/or tire as, for example, when it is necessary to paint a fender by the usual spray method. Generally speaking, the most common way of masking a wheel involves the use of masking paper and tape which is naturally time consuming and laborious. Also, a problem arises when it is desired to mask off a tire for the purpose of painting a wheel.

Consequently, it is a primary object of this invention to provide an improved masking device which is characterized by being quickly and easily applied for the purpose of masking an automobile tire and wheel assembly.

Another object of this invention resides in the provision of a masking device which may be used either to mask the tire alone or a tire and wheel assembly, dependent upon the area to be painted.

A further object of this invention resides in the provision of a masking device of the character described employing an expansible hoop which is adapted to resiliently grip a wheel rim and which carries a flexible masking element which is adapted to be draped about an associated tire for protecting the same as a mask.

Another object of this invention resides in a device in conformity with the preceding object wherein the masking element incorporates a removable center section for exposing the wheel proper when desired while leaving the tire in masked condition so that the wheel may be painted.

A further object of this invention resides in a masking device which is easily and quickly mounted on a wheel and tire assembly and which incorporates a flexible masking element having associated therewith a drawstring device for snugly holding the masking device in covering relation to a tire.

With the above and other objects in view, the invention consists in the construction and novel combination and arrangement of parts hereinafter fully described, illustrated in the accompanying drawing and pointed out in the claims hereto appended, it being understood that various changes in the form, proportions, and minor details of construction, within the scope of the claims, may be resorted to without departing from the spirit or sacrificing any of the advantages of the invention.

Figure 1:
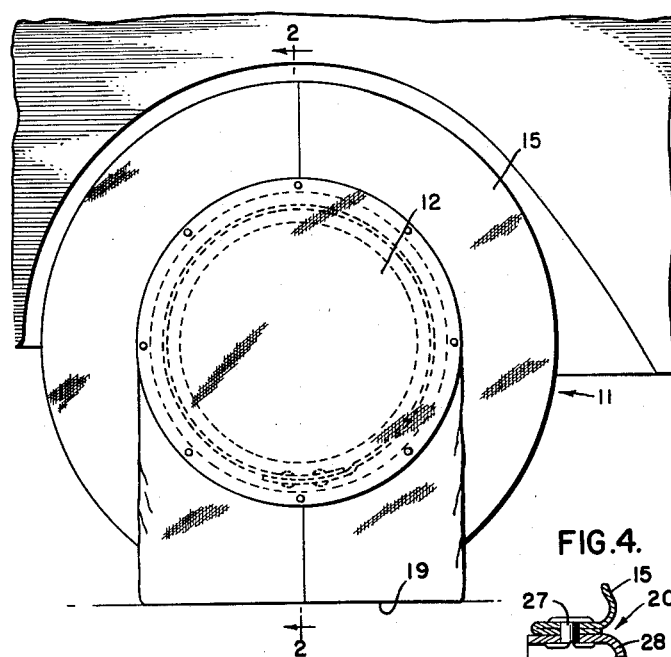
Fig. 1 is a side elevational view of a portion of a vehicle body showing the improved masking device in operative position on a wheel thereof.

As shown most clearly in Fig. 1, the instant invention is particularly useful in automobile body shops and in the particular instance in which the fender assembly indicated generally by the reference character 10 is desired to be painted without, of course, inadvertently spraying paint on the wheel assembly, the latter assembly being shown in covered condition as indicated by the reference character 11.

Figure 2:
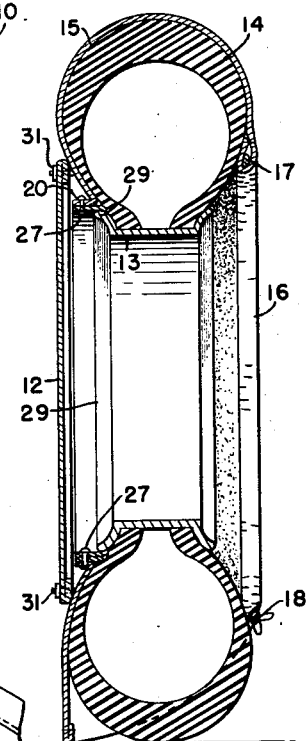
Fig. 2 is an enlarged vertical section taken substantially along the plane of section line 2—2 of Fig. 1, illustrating further details of the masking device and illustrating more clearly the removable center section for exposing the wheel.

As seen in Fig. 2, the center portion 12 of the masking device covers the wheel 13 upon which the tire 14 is mounted, whereas the outer portion 15 of the masking device covers and masks off the tire. The outer portion 15 is of sufficiently large area to lap over the outside of the tire and extend to the rear thereof and this outer portion terminates along its edge in a looped hem 16 which has associated therewith a drawstring 17 which is adapted to pull the outer portion 15 of the masking device snugly upon the tire assembly and hold it in place during the painting operation. Preferably, the drawstring is simply a length of flexible material, such as cord, or it may be of elastic material, and its opposite ends are joined by a knot 18 to secure the masking cover in place.

Figure 3:
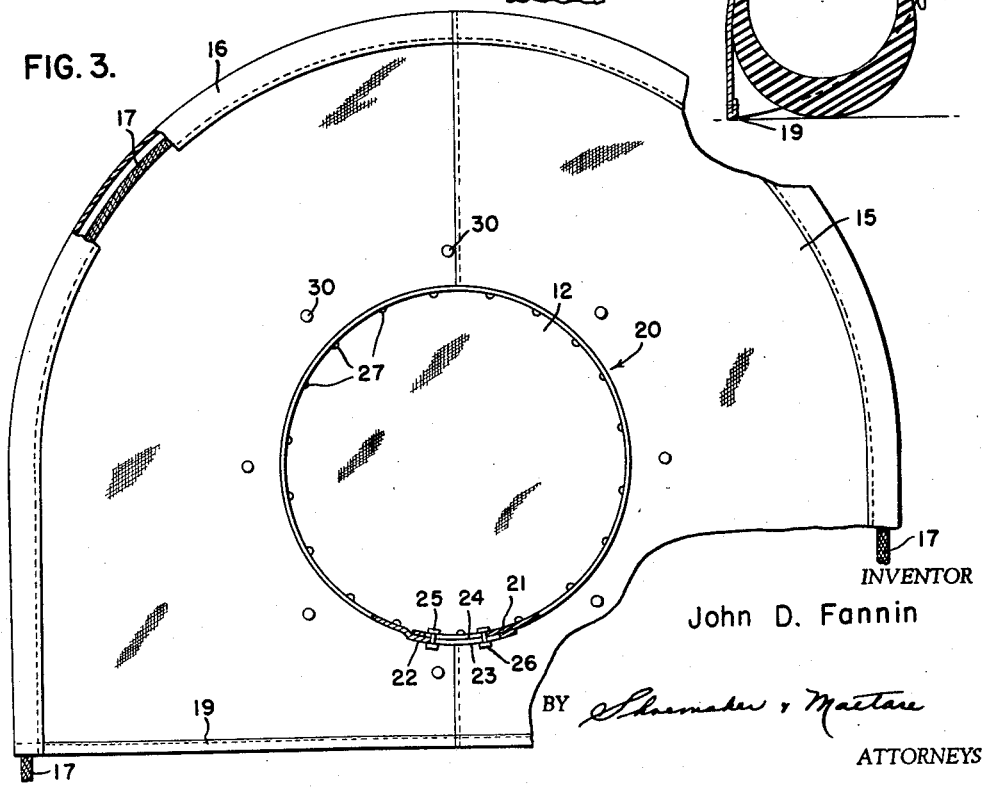
Fig. 3 is a rear plan view of the masking assembly.

As shown in Fig. 3, the general shape of the assembly is substantially semi-circular and the lower edge 19 thereof, which is reinforced by folding it back upon itself is straight and is adapted to rest upon the ground surface as is shown in Figs. 1 and 2. The outer portion 15 of the masking device is provided with a substantially centrally disposed circular cut-out portion and within this cut out is an expansible hoop indicated generally by the reference character 20, which is preferably made of spring steel or the like so as to have an inherent resiliency. The opposite end portions 21 and 22 of this hoop are disposed in overlapping relationship and provided with registering slots 23 and 24 which extend a substantial distance along the lengths of the opposite end portion and within which operate a pair of floating rivet members 25 and 26 so as to maintain the opposite ends of the hoop in engagement but permit expansion and contraction thereof. Naturally, the hoop is so constructed initially that it is normally disposed in the fully collapsed position so as to present its smallest diameter when at rest.

Figure 4:
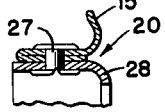
Fig. 4 is an enlarged sectional view taken through the expansible hoop illustrating the manner in which the flexible masking element is attached thereto.

As seen most clearly in Fig. 4, the outer portion 15 of the masking device is secured to the hoop 20 by virtue of a series of circumferentially spaced rivets 27 and to insure a good solid connection between the material of the flexible outer cover 15 and the hoop, the former is doubled upon itself as shown in this figure and engaged against the outer surface of the hoop so that the rivets 27 pass through a double thickness of the material 15.

The inner edge of the hoop, as seen in Fig. 4, is bent inwardly as indicated by the reference character 28 so as to engage behind and firmly grip upon the outer edge 29 of the wheel rim and the inherent resiliency of the hoop is such as to firmly hold upon the wheel rim.

Circumferentially arranged radially outwardly of the hoop 20 and on the outer flexible portion 15 of the masking device are a series of snap fasteners 30 and complemental snaps 31 are provided on the center portion 12 peripherally thereof so that the center portion 12 is removably secured to the outer portion 15. The purpose of this construction is to permit removal of the center portion 12 so as to gain access to the wheel 13 for the purpose of painting the same, while still retaining the tire 14 in masked condition.

Preferably, the contour of the upper portion of the masking device is so related to the position of the hoop 20 that the same is of substantially uniform width to neatly engage over the tire 14, see particularly Fig. 3, Fig. 3 also serves to illustrate that the device may be made into sections joined along a vertical center line to conserve material when the blanks for the device are cut. Preferably, the material for the masking device is of such a nature as to be relatively resistant to wear and may be made of such material as canvas or the like.

I claim:

1. A masking device for protecting an automobile wheel and tire during painting comprising an outer flexible body section adapted to be draped about and protectively cover the entire outer side surface of an automobile tire, said outer body section having a central circular opening therein corresponding substantially to the outer diameter of a wheel rim associated with a tire, means attached to the edge portion of the body opening for locating and holding said outer body section on a wheel and tire assembly with the opening therein in register with and concentrically disposed with respect to the wheel rim, and removable cover means normally closing said opening and protecting said wheel during body painting.

2. A masking device for protecting an automobile wheel and tire during body painting which comprises flexible cover means adapted to be draped about and protectively cover the outer side surface of a wheel and tire assembly, and means for removably securing said cover to the rim of the associated wheel, said means comprising a length of resilient metallic material disposed in substantially circular configuration with the opposite ends thereof overlapping, the normal diameter of said resilient metallic material being smaller than an associated wheel rim so as to be expanded and clampingly engaged thereover to hold the cover in place, means fastening said cover to said resilient metallic material.

3. The assembly as defined in and by claim 2 including a drawstring connected to said cover for disposition on the side of a tire opposite from said means and coacting with said means for snugly embracing the associated tire by the cover.

4. The assembly as defined in and by claim 2 wherein said flexible cover comprises an outer section for protectively covering the associated automobile tire and an inner section for protectively covering the associated wheel, said outer section having a central opening therein located concentrically and in register with the wheel rim, and said inner section being removably attached in covering relationship to said opening so as to expose the wheel when desired for painting the same while still maintaining the tire in protected, covered relationship by the outer section.

5. A masking device for protecting an automobile wheel and tire assembly during painting which comprises a flat sheet of flexible fabric having an arcuate upper peripheral portion to be draped over the upper portion of an associated tire and having a lower chordal edge portion adapted to engage the ground surface on the outer side of a tire so as to completely cover and protect the outer side surface of the tire, said sheet having a central circular opening therein, a resilient metallic hoop disposed peripherally of such opening and secured to the fabric and clampingly engaging the outer surface of the rim of the associated wheel so as to maintain said opening in register with the wheel rim, a center cover member covering said opening and normally protecting said wheel, said center cover being provided with peripherally disposed fastening elements detachably coupled to said flexible sheet.

6. The invention according to claim 5, wherein said hoop has an inner edge portion in the form of a radial inwardly directed flange whereby the said clamping engagement with the outer surface of the associated wheel rim is effected.

References Cited in the file of this patent

UNITED STATES PATENTS

| | | |
|---|---|---|
| 2,081,666 | Gunn | May 25, 1937 |
| 2,231,333 | Gunn | Feb. 11, 1941 |
| 2,552,287 | Layne | May 8, 1951 |
| 2,627,839 | Hudgins et al. | Feb. 10, 1953 |
| 2,634,704 | Morrison | Apr. 24, 1953 |
| 2,652,023 | Kletsky | Sept. 15, 1953 |
| 2,716,391 | Nonemaker et al. | Aug. 30, 1955 |
| 2,726,634 | Horner | Dec. 13, 1955 |
| 2,728,323 | Walton et al. | Dec. 27, 1955 |